3,519,628
ARALKYL DIAZABICYCLO(4,4,0)DECANES
Gilbert Regnier, Sceaux, Roger Canevari, La Hay-les-Roses, and Jean-Claude Le Douarec, Suresnes, France, assignors to Science Union et Cie, Societe Francaise de Recherche Medicale, Suresnes, France, a French society
No Drawing. Filed Dec. 19, 1966, Ser. No. 602,535
Claims priority, application Great Britain, Jan. 7, 1966, 871/66
Int. Cl. C07d 51/70
U.S. Cl. 260—268        9 Claims

ABSTRACT OF THE DISCLOSURE 1,4-diazabicyclo (4,4,0) decane compounds substituted in position 4, by phenyl-methyl, phenyl-ethyl, or phenyl-propyl radicals, wherein the phenyl ring may be substituted by halogen atoms, halogenomethyl, lower-alkyl, lower alkoxy, methylene-dioxy or ethylenedioxy groups;
the mono, di or tri-methylenic side chain may be substituted on the carbon atom adjacent to the phenyl radical by one or two phenyl or cyclohexyl radical, or by one hydroxyl radical.

These compounds possess parasympathicolytic, anticholinergic, musculotropic-spasmolytic and antiserotonin properties.

---

The present invention provides compounds of diazabicyclo (4,4,0) decane of the general formula

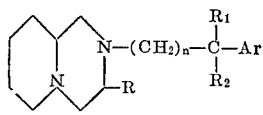

(I)

wherein

R represents a hydrogen atom or a methyl radical,
$n$ represents an integer from 0 to 2,
$R_1$ and $R_2$ represent a hydrogen atom, a phenyl ring, a cyclohexyl ring or one of them may be a hydroxyl radical,
Ar represents a phenyl ring or phenyl substituted by
   a halogen atom,
   a halogenomethyl radical,
   a lower-alkyl radical having up to and including five carbon atoms,
   one or more lower-alkoxy groups having up to and including five carbon atoms, or alkylenedioxy group such, for example, as O—(CH$_2$)$_m$—O where $m$=1 or 2.

The derivatives of the general Formula I are new compounds and possess valuable pharmacological and therapeutic properties, especially musculotropic spasmolytic properties acting upon intestinal and bronchial spasms; they also exhibit adrenolytic, anticholinergic, antihistaminic and antiserotonin properties.

The compounds of the invention may be obtained by reacting a derivative of the general Formula II

(II)

in which $R_1$, $R_2$, Ar and $n$ have the above meanings, and Z represents a chlorine or bromine atom or the residue of an arylsulphonic ester such, for example, as an ester of benzenesulphonic or para-toluenesulphonic acid, with a diazabicyclodecane of the general formula

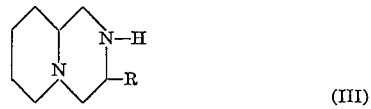

(III)

in which R has the same meaning as defined above.

In the most advantageous form of the process for the manufacture of the new compounds, a compound of the Formula II is reacted with a suitable diazabicyclodecane of the Formula III in the form of a solution in a high-boiling aromatic hydrocarbon such, for example, as toluene or xylene, or in a polar solvent chosen from the aliphatic amides such, for example, as dimethylformamide or dimethylacetamide. It is advantageously carried out within the temperature range from 110° to 140° C. in the presence of a substance capable of combining with the hydrohalic acid or the arylsulphonic acid formed during the reaction. This acid acceptor may be any one of the alkali metal or alkaline earth metal salts of carbonic acid, such, for example, as the bicarbonate or carbonate of sodium or potassium, or calcium carbonate, or a tertiary organic base such, for example, as dimethylaniline, pyridine or triethylamine. Instead of such a salt or such a base there may be used an excess of the diazabicyclodecane selected. This latter procedure is particularly advantageous if in the compound II to be condensed, the symbol Z represents the residue of an arylsulphonic acid ester; in such a case, the excess of diazabicyclodecane used takes over the role of the solvent. This form of the process of the invention is, incidentally, not restricted to the sulphonic acid esters and may be applied equally well in the case where Z represents a halogen atom.

The condensation product obtained is then advantageously subjected to a hydrolysis by means of a strong base or acid, or to a hydrogenolysis in the presence of a catalyst such, for example, as palladium on charcoal, according to any one of the methods known to be suitable for liberating a phenolic function from a protective group of the above kind.

The new derivatives of diazabicyclodecane obtained in this manner are weak bases and can be converted with suitable acids into physiologically tolerable acid addition salts which are likewise included in the present invention. These acid addition salts are obtained by the action of the new compounds upon acids in suitable solvents such, for example, as water or water-miscible alcohols. As acids suitable for the formation of acid addition salts, there may be mentioned mineral acids, such, for example, as hydrochloric, hydrobromic, methanesulphonic, sulphuric acid and phosphoric acid; suitable organic acids are acetic, propionic, maleic, fumaric, tartaric, citric, oxalic and benzoic acid. If desired, these new compounds may be purified by physical operations such, for example, as distillation, crystallization, chromatography or by chemical operations such, for example, as formation of the aforementioned salts, followed by crystallization of the salts and their decomposition by alkaline reagents.

These new compounds and their addition salts possess valuable pharmacological and therapeutic properties and may be used as medicaments acting especially on the smooth fibre of the gastro-intestinal, genito-urinary, respiratory and cardiovascular system, and on the autonomic nervous system.

Their toxicity was studied by oral and intraperitoneal administration in mice. The median lethal dose (MLD) varies from 75 to 250 mg./kg. i.p. and from 750 to 2000 mg./kg. p.o.

The pharmacological activity of the new compounds was studied in vitro on the isolated organs. It was found that, at very low concentrations, they were able to antagonize the action of acetyl choline and histamine on the guinea pigs' ileum, the spasm provoked by barium chloride on the rat's duodenum, and also the activity of adrenaline on the rat's seminal vesicle.

A strong antiserotonin action in vivo was also noted by the inhibition of the plantar oedema of the rat's paw induced by serotonin.

These pharmacological properties and the low toxicity of these new diazabicyclodecanes enable their use in human or animal therapy, especially in the treatment of different diseases or syndromes wherein the use of medicaments exhibiting a parasympathicolytic, anticholinergic, antispasmodic and antiserotonin activity are indicated, such, for example, as intestinal spasms, gastro-duodenal ulcer, nephrolithiasis and cholelithiasis, angiospasm, dysmenorrhoea, and migrain.

The compounds of the invention may be administered in different pharmaceutical forms, in conjunction or admixture with a pharmaceutically suitable solid or liquid carrier such, for example, as distilled water, glucose, lactose, talc, gum-arabic or magnesium stearate.

The doses used may vary from 10 to 200 mg. in oral, rectal or parenteral administration.

The following examples illustrate the present invention, but are not to be construed as limiting. The melting points were measured under a microscope on a Kofler heater.

EXAMPLE 1

4-(3',4'-methylenedioxy benzyl)-1,4-diazabicyclo (4,4,0) decane

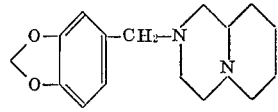

A solution of 6 grams of 1,4-diazabicyclo (4,4,0) decane and 7.7 grams of 3,4-methylene dioxy benzyl chloride in 400 cc. of xylene was heated for 10 hours at 135° C. in the presence of 12.4 grams of anhydrous potassium carbonate. On completion of the reaction, the salt was filtered off and the xylene solution was repeatedly extracted with hydrochloric acid of 10% strength. The combined acid solution was washed with ether and then alkalinised with sodium hydroxide solution of 10% strength. The salted out oily base was extracted with ether, and the extract dried over potassium carbonate and evaporated under vacuum to yield 10 grams of a crude, oily base.

On dissolution in anhydrous ethanol and addition of an ether solution of anhydrous hydrochloric acid, there were obtained 7.6 of white crystals of the hydrochloride melting at 239–241° C.

By the same method, the following compounds were prepared:

(a) 4-(3',4'-methylenedioxy benzyl)-3-methyl-1,4-diazabicyclo (4,4,0) decane starting from 3-methyl-1,4-diazabicyclo (4,4,0) decane and 3,4-methylenedioxy benzyl chloride. Its hemihydrate dihydrochloride melted at 187–205° C. with decomposition.

(b) 4-(3',4'-methylenedioxy phenethyl)-1,4-diazabicyclo (4,4,0) decane, starting from 1,4-diazabicyclo (4,4,0) decane and 3,4-methylenedioxy phenethyl chloride. The dihydrochloride melted at 210–214° C. with decomposition.

(c) 4 - (3',4' - dimethoxy benzyl) - 1,4 - diazabicyclo (4,4,0) decane starting from 1,4-diazabicyclo (4,4,0) decane and 3,4 - dimethoxy benzylchloride. The dihydrochloride melted at 152–154° C.

(d) 4 - (2',3',4'-trimethoxy benzyl) - 1,4 - diazabicyclo (4,4,0) decane starting from 1,4-diazabicyclo (4,4,0) decane and 2,3,4-trimethoxy benzylchloride. The dihydrochloride melted at 190–195° C. with decomposition.

(e) 4-Δ2',2'-diphenyl-2'-hydroxy ethyl)-1,4-diazabicyclo (4,4,0) decane starting from 1,4-diazabicyclo (4,4,0) decane and 2-hydroxy 2,2-diphenyl ethylchloride. The dihydrochloride melted at 210° C.

(f) 4-(α-cyclohexyl benzyl)-1,4-diazabicyclo (4,4,0) decane starting from 1,4-diazabicyclo (4,4,0) decane and α-cyclohexyl benzylchloride. The dihydrochloride melted at 239–240° C.

(g) [1'-(3',3'-diphenyl-3'-hydroxy propyl)]-1,4-diazabicyclo (4,4,0) decane starting from 1,4-diazabicyclo (4,4,0) decane and 3,3-diphenyl 3-hydroxy propylchloride. The difumarate melted at 189–198° C. with decomposition.

EXAMPLE 2

4-(2'-phenylethyl)-1,4-diazabicyclo (4,4,0) decane

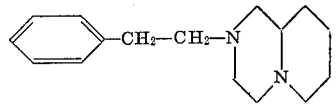

A solution of 10 grams of 1,4-diazabicyclo (4,4,0) decane and 13.3 grams of phenethylbromide in 400 cc. of N,N-dimethylacetamide was heated for 14 hours at 130° C. in the presence of 20 grams of anhydrous potassium carbonate. On completion of the reaction the salt was filtered off and the solvent evaporated under reduced pressure. The residue was then dissolved in an excess of hydrochloric acid of 10% concentration and the resulting solution was worked up as described in Example 1. The corresponding dihydrochloride melted at 210–212° C. with decomposition.

The following examples were prepared as per the process described in the foregoing Example 2.

(a) 4 - benzhydryl - 1,4 - diazabicyclo (4,4,0) decane, starting from 1,4-diazabicyclo (4,4,0) decane and benzhydrylbromide. The dihydrochloride melted at 195–210° C., with decomposition.

(b) 4-[1'-(3',3'-diphenyl - propyl)] - 1,4 - diazabicyclo (4,4,0) decane, starting from 1,4-diazabicyclo (4,4,0) decane and 3,3-diphenyl propyl bromide. The dihydrochloride melted at 200–207° C. with decomposition.

(c) 4 - (para - chlorobenzhydryl) - 1,4 - diazabicyclo (4,4,0) decane, starting from 1,4-diazabicyclo (4,4,0) decane and para-chlorobenzhydryl bromide. The dihydrochloride melted at 168–171° C.

(d) 4-(para-fluorobenzhydryl)-1,4-diazabicyclo (4,4,0) decane, starting from 1,4-diazabicyclo (4,4,0) decane and para-fluorobenzhydryl bromide. The dihydrochloride melted at 190–220° C. with decomposition.

(e) 4 - (para - methylbenzhydryl) - 1,4 - diazabicyclo (4,4,0) decane, starting from 1,4-diazabicyclo (4,4,0) decane and para methylbenzhydryl bromide. The dihydrochloride melted at 227–230° C.

(f) 4-(meta - trifluoromethyl benzhydryl)-1,4-diazabicyclo (4,4,0) decane, starting from 1,4 diazabicyclo (4,4,0) decane and meta-trifluoromethyl benzhydryl bromide. The hydrochloride melted at 204–230° C. with decomposition.

(g) 4 - (para - methoxybenzhydryl) - 1,4 - diazabicyclo (4,4,0) decane, starting from 1,4-diazabicyclo (4,4,0) decane and para-methoxybenzhydryl bromide. The dihydrochloride melted at 168–173° C.

(h) 4-benzhydryl-3-methyl - 1,4 - diazabicyclo (4,4,0) decane, starting from 3-methyl 1,4-diazabicyclo (4,4,0) decane [Winterfeld and Gierenz, Berichte, 92, 240–244 (1959)] and benzhydryl bromide. The fumarate melted at 236–245° C. with decomposition.

EXAMPLE 3

4-[1'-(3',3',3'-triphenyl-propyl)]1,4-diazabicyclo (4,4,0) decane

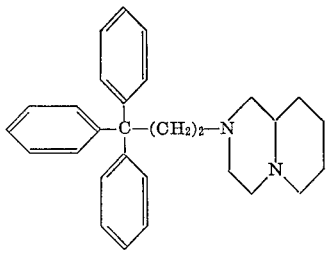

15 grams of 3,3,3-triphenyl propyl para-toluenesulphonate (melting at 118° C.) and 14.1 grams of diazabicyclo (4,4,0) decane were heated for 3 hours at 120° C. On completion of the reaction, 100 cc. of water were added to the residue and the mixture was repeatedly extracted with ether. The ether extract was washed with water and dried over anhydrous potassium carbonate. The ether was then evaporated and the oily residue, weighing 12 grams, dissolved in 40 cc. of boiling ethanol. This solution was mixed with a solution of 7 grams of fumaric acid in 70 cc. of ethanol, to yield 18 grams of the crystalline acid difumarate melting at 165 to 170° C. with decomposition.

What we claim is:
1. A compound selected from the group consisting of (A) diazabicyclo (4,4,0) decane compounds of Formula I

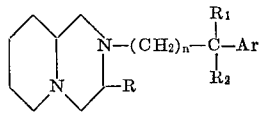

(I)

wherein R is hydrogen or methyl, $n$ is 0, 1 or 2, $R_1$ is, hydrogen, phenyl or cyclohexyl, $R_2$ is hydrogen, phenyl or hydroxyl, Ar is phenyl, chlorophenyl, fluorophenyl, trifluoromethylphenyl, or lower-alkyl phenyl wherein the alkyl moiety has from 1 to 3 carbon atoms inclusive, or mono-, di-, or trialkyloxy phenyl wherein the alkyl moiety has from 1 to 5 carbon atoms inclusive, or methylenedioxy phenyl, and (B) physiologically acceptable addition salts thereof with organic and mineral acids.

2. A compound of claim 1 which is 4-(3',4'-methylenedioxy benzyl)-1,4-diazabicyclo (4,4,0) decane.

3. A compound of claim 1 which is 4-(3',4'-dimethoxy benzyl)-1,4-diazabicyclo (4,4,0) decane.

4. A compound of claim 1 which is 4-(α-cyclohexyl benzyl)-1,4-diazabicyclo (4,4,0) decane.

5. A compound of claim 1 which is 4-benzhydryl-1,4-diazabicyclo (4,4,0) decane.

6. A compound of claim 1 which is 4-[1'-(3',3'-diphenyl-propyl)]-1,4,-diazabicyclo (4,4,0) decane.

7. A compound of claim 1 which is 4-(para-chlorobenzhydryl)-1,4-diazabicyclo (4,4,0) decane.

8. A compound of claim 1 which is a 4-(para-fluorobenzhydryl)-1,4-diazabicyclo (4,4,0) decane.

9. A compound of claim 1 which is 4-(meta-trifluoromethyl benzhydryl)-1,4-diazabicyclo (4,4,0) decane.

References Cited

UNITED STATES PATENTS

| 2,999,860 | 9/1961 | Krimmel et al. | 260—268 |
| 3,164,598 | 1/1965 | Freed | 260—268 |
| 3,176,017 | 3/1965 | Freed | 260—268 |
| 3,388,128 | 6/1968 | Day et al. | 260—268 |

OTHER REFERENCES

Freed et al.: Jour. Org. Chem., vol. 25, pp. 2108–13 (1960).

DONALD G. DAUS, Primary Examiner

U.S. Cl. X.R.

260—340.5, 340.6, 456, 650, 613, 999

UNITED STATES PATENT OFFICE
CERTIFICATE OF CORRECTION

Patent No. 3,519,628  Dated July 7, 1970

Inventor(s) Gilbert Regnier, et al.

It is certified that error appears in the above-identified patent and that said Letters Patent are hereby corrected as shown below:

| | |
|---|---|
| Column 4, line 16 | "4-A2',2'-" should read |
| Appl. Page 4, line 27 | --- 4-(2',2'- --- |
| | |
| Column 4, line 24 | "[1'-(3',3'-" should read |
| Appl. Page 4, line 33 | --- 4-[1'-(3',3'- --- |
| | |
| Column 6, line 5 | "from 1 to 3" should read |
| Appl. Amendment dated June 13, 1969, Schedule A | --- from 1 to 5 --- |

SIGNED AND
SEALED
NOV 24 1970

(SEAL)
Attest:

Edward M. Fletcher, Jr.
Attesting Officer

WILLIAM E. SCHUYLER, JR.
Commissioner of Patents